Nov. 11, 1941.　　　　H. P. RUF　　　　2,262,373
RUFF-CORD-MAKING MACHINE
Filed May 25, 1940　　　　2 Sheets-Sheet 1
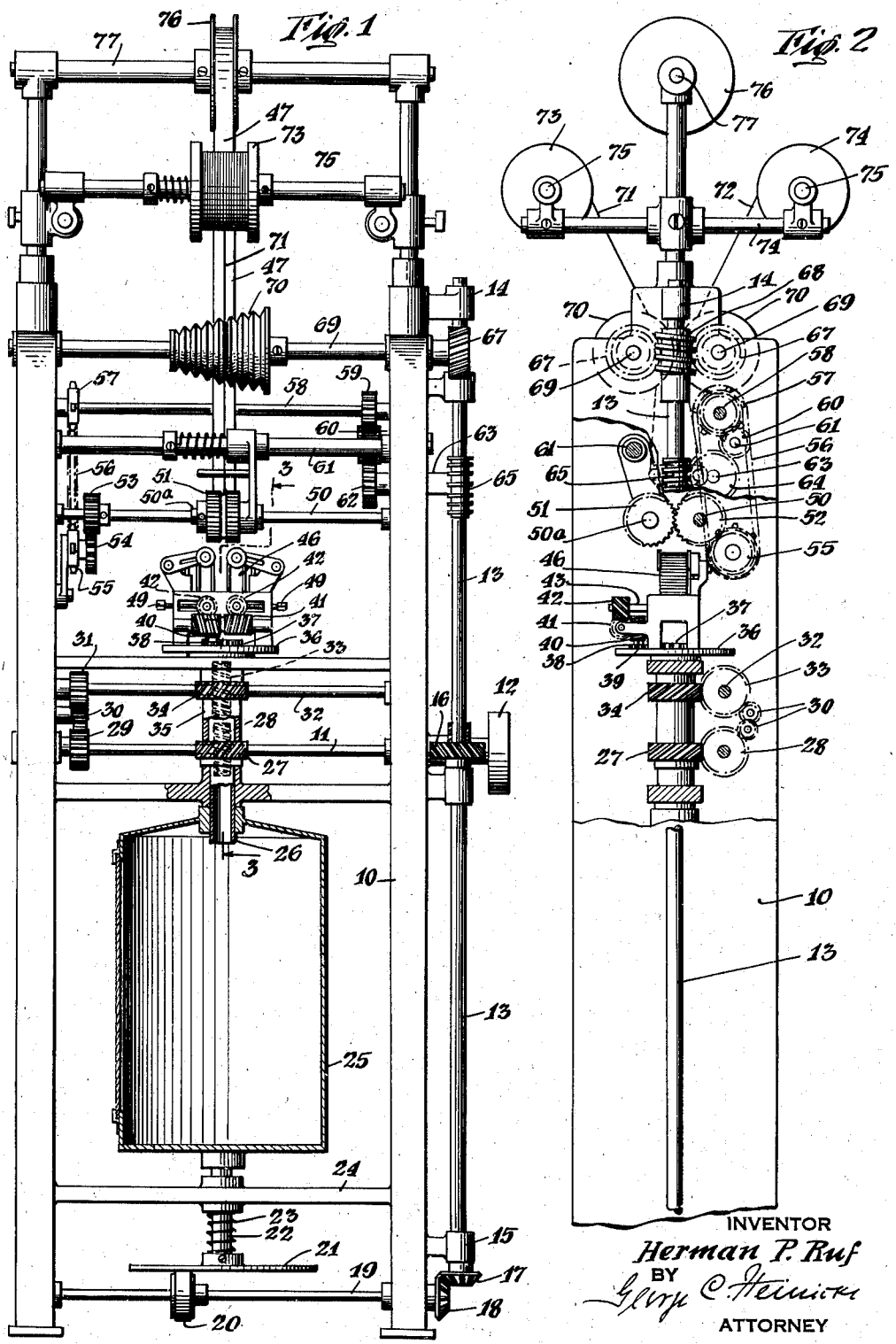
INVENTOR
Herman P. Ruf
BY
George C. Heinicke
ATTORNEY Nov. 11, 1941.  H. P. RUF  2,262,373
RUFF-CORD-MAKING MACHINE
Filed May 25, 1940  2 Sheets-Sheet 2
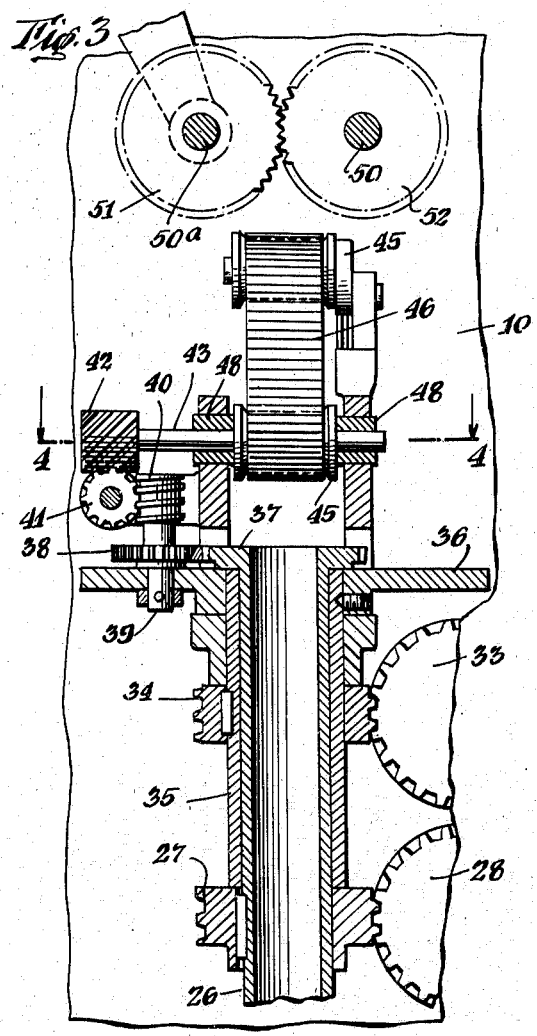
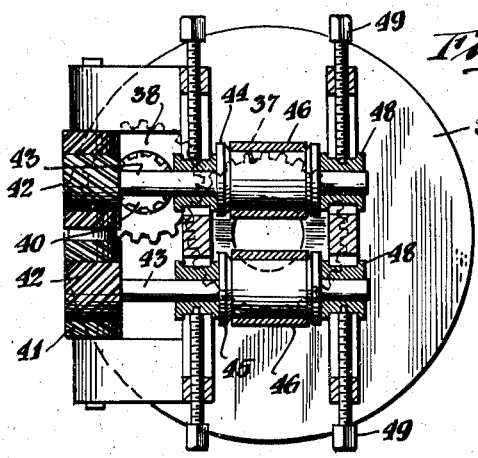
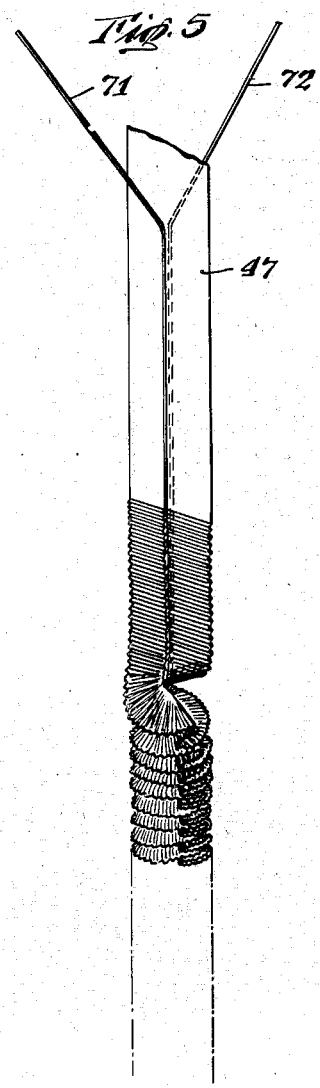
INVENTOR
*Herman P. Ruf*
BY
ATTORNEY Patented Nov. 11, 1941

2,262,373

UNITED STATES PATENT OFFICE 2,262,373

RUFF-CORD-MAKING MACHINE

Herman P. Ruf, New York, N. Y.

Application May 25, 1940, Serial No. 337,151

2 Claims. (Cl. 57—6)

This invention relates to improvements in machines for making twisted ruff cord, or other, similar articles.

Such a machine is for instance disclosed in my Patent No. 1,801,388, dated April 21, 1931, and it is the object of this invention to improve the machine described therein by replacing the rubber rollers used in said patented machine by a belt carrier for twisting and feeding the material and allowing the use of flat material as a filler, said material being either plain or can be fluted for giving a nicer effect to the finished goods.

Another object of my invention is the provision of a machine replacing the former, so-called alley-machines by a compactly constructed, upright machine for producing twisted cord of a desired shape, color and size from suitable material around a core member by continuous operation.

A further object of my invention is the provision of such a machine of this character which takes up a comparatively small space, and while simple in its construction and not too expensive, is durable and highly efficient in operation.

A still further object of my invention is the provision of a machine for making ruff cord or the like in which the pitch of the ornamental ruffles or flutings may be varied according to requirement by means of suitable change gear mechanisms or the like.

Further objects of my invention are the replacement of the rubber rollers used in my patented machine by a belt carrier of novel design, and the provision of adjustable rollers for making large or small ropes of paper, cloth, chenille, Cellophane or like materials, twisted and fluted for use in fancy decorations to suit any occasion, or for making drapings, Hawaiian Pois wreaths etc., as many variations can be produced by changes in the nature, color, lengths and widths of the material used, and the gauge and nature of the wire or cord used as a core and by suitably regulating the twist etc.

These and other objects and advantages of my invention will become more fully known as the description thereof proceeds and will then be specifically defined in the appended claims.

In the accompanying drawings forming a material part of this disclosure:

Fig. 1 is the front elevation of a machine constructed according to my invention, partly in section.

Fig. 2 is a fragmentary side elevation thereof, parts being broken away for the sake of clearer illustration.

Fig. 3 is a longitudinal section on line 3—3 of Figure 1, on an enlarged scale.

Fig. 4 is a cross-section on line 4—4 of Figure 3, and

Fig. 5 shows fragmentarily a piece of the goods made by the machine.

As illustrated, the machine consists substantially of an upright frame or bed 10 in which is journaled a horizontally disposed driving shaft 11, the outer end of which extends beyond the frame and carries a drive pulley or wheel 12. A vertically disposed spindle 13 laterally arranged to said frame or bed has its ends supported in suitable bearings 14, 15 to rotate therein.

Intermediate its ends the spindle 13 carries a gear 16 to be rotated during the rotation of the driving shaft 11, and at its lower end the spindle 13 carries a bevel gear 17 in mesh with a bevel gear 18 at the outer end of a shaft 19 journaled in the main frame and carrying intermediate its ends a friction roller or wheel 20 engaging from below a disc or plate 21 at the lower end of a shaft 22 cushioned by means of a spring 23 wound about its lower end. This shaft is journaled in and extends through a partition 24 in the machine frame, and its upper end carries a container 25 for the finished goods to be nicely piled therein during the rotation of the container which for this purpose is suspended from an inner tubular shaft 26 (Fig. 3) to which is keyed a gear 27 adapted to be rotated from a gear 28 meshing therewith, and arranged on shaft 11. This shaft 11 carries also at its inner end a gear 29 meshing with a smaller gear 30 in turn meshing with a gear 31 on a shaft 32 journaled in the machine frame, and this shaft 32 carries a gear 33 in mesh with a gear 34 keyed to a hollow shaft 35 in which the shaft 26 is rotating.

The shaft 35 carries at its upper end a table 36 on which rotates a gear 37 on the upper end of the inner shaft 26 in mesh with a gear 37 on the upper end of the inner shaft 26 in mesh with a gear 38 on a stub shaft 39 secured on table 36 and carrying at its upper end a helical gear 40 in mesh with a double helical gear 41 made in two connected parts, each having its threads running in a direction opposite to the thread on the other part. In mesh with the gear 41 are gears 42 on shafts 43 carrying the guide rollers 44, 45 for the conveyor band 46 which may be suitably ribbed for feeding the paper or Cellophane band 47. The rollers are arranged on their shafts 43 which are journaled in bearing blocks 48 and are adjustable by means of the screws 49.

On a cross-spindle 50, the crimper gears for the paper band 47 are located, designated 51, 52, and roller or gear 51 is on stud 50a and spring pressed against roller or gear 52.

A gear 53 on spindle 50 meshes with a smaller gear 54, the stub shaft of which carries a sprocket wheel 55 over which is guided a chain 56 which is also guided over a sprocket wheel 57 on cross-shaft 58. This shaft 58 carries also a gear 59 meshing with a smaller gear 60 on shaft 61 which in turn meshes with a gear 62 on a stub shaft 63 which is rotated by means of a gear 64 from a worm 65 on spindle 13.

The upper end of the spindle 13 carries a worm 68 engaging worm gear 67 on shafts 69 carrying cone members 70 over the outer threads of which the cord 71 and wire 72 are displaceably guided while they are unwound from their spools 73 and 74 respectively arranged at the ends of a cross-bar or head 75, while the band 47 is unwound from a spool 76 on a shaft 77.

During the operation of the machine the core wire 72 and core cord 71 are twisted and the band 47, after having passed between the fluted rollers 51 and 52 is wound convolutely about the core to present a ruff cord or material illustrated in Figure 5. The size of the cord can evidently be changed as desired by the suitable arrangement of the change speed gear mechanism of any well known construction allowing a wider or narrower pitch to the convolutions.

It will be understood that I may make such changes in the general arrangement of the machine and in the construction of its minor details as come within the scope of the appended claims without departure from the spirit of my invention and the principles involved, as disclosed in the specification and drawings as one example of the many possible different ways in which the machine may practically be manufactured.

Having thus described my invention, what I claim as new and desire to secure by Letters Patent is:

1. In a machine as described, cross-spindles, a threaded cone member on each of said spindles over which wire and cord forming the core of the ruff cord are changeably guided, a drive for said spindles, a cross-shaft and crimper gears on said cross-shaft driven from said drive, a paper band fed to said crimper gears, and rotary means operated by said drive to twist the wire, cord and paper band to form a ruff cord.

2. In a feeding mechanism for the material in ruff cord making machines, a frame, a drive carried by said frame, cross-shafts journaled in said frame, cone members carried by said cross-shafts and driven by said drive for feeding the wire and cord forming the core of said ruff cord, a cross-spindle in said frame below said cross-shafts, crimper gears on said cross-spindle to which the band forming the envelope for said core is fed by the machine drive, a ribbed conveyor band for feeding the crimped band, and guide rollers therefor, means operated from the machine drive to rotate said guide rollers, shafts for said rollers journaled in bearing blocks, means to adjust said bearing blocks, and a vertical shaft rotated by the machine drive to twist the wire cord and band to form a ruff cord.

HERMAN P. RUF.